(12) United States Patent
Claerhout et al.

(10) Patent No.: US 10,155,550 B2
(45) Date of Patent: Dec. 18, 2018

(54) DEPLOYABLE TRIM PANELS FOR REPAIR/MAINTENANCE ACCESS TO AN ARTICULATED HARVESTING COMBINE

(71) Applicant: Tribine Industries LLC, Logansport, IN (US)

(72) Inventors: Bryan S. Claerhout, Hesston, KS (US); Robert A. Matousek, Valley Center, KS (US)

(73) Assignee: Tribine Industries LLC, Logansport, IN (US)

( * ) Notice: Subject to any disclaimer, the term of this patent is extended or adjusted under 35 U.S.C. 154(b) by 0 days.

(21) Appl. No.: 15/662,332

(22) Filed: Jul. 28, 2017

(65) Prior Publication Data

US 2018/0215421 A1    Aug. 2, 2018

Related U.S. Application Data

(60) Provisional application No. 62/376,512, filed on Aug. 18, 2016.

(51) Int. Cl.
*B62D 33/08* (2006.01)
*B62D 25/10* (2006.01)
*A01B 76/00* (2006.01)
*B60R 3/00* (2006.01)
*B60R 13/04* (2006.01)

(52) U.S. Cl.
CPC .............. *B62D 33/08* (2013.01); *A01B 76/00* (2013.01); *B60R 13/04* (2013.01); *B60Y 2200/222* (2013.01); *B62D 25/10* (2013.01)

(58) Field of Classification Search
CPC ........... B60R 3/002; B60R 3/005; B60R 3/02; B60R 13/04; A01B 76/00; A01D 41/1261; B62D 25/10; B62D 33/08; B60Y 2200/222
See application file for complete search history.

(56) References Cited

U.S. PATENT DOCUMENTS

| | | | | |
|---|---|---|---|---|
| 4,848,498 A | * | 7/1989 | Hart | B60J 5/00 180/69.2 |
| 2007/0289790 A1 | * | 12/2007 | Moen | B62D 25/10 180/69.2 |
| 2008/0217945 A1 | * | 9/2008 | Barnes | B62D 21/14 296/26.13 |
| 2009/0020349 A1 | * | 1/2009 | Renard | B62D 25/10 180/69.2 |

(Continued)

*Primary Examiner* — Gregory A Blankenship
(74) *Attorney, Agent, or Firm* — Mueller Law, LLC; Jerry K. Mueller, Jr.

(57) ABSTRACT

A harvesting combine has a forward operator's cab and having a rear, and carrying laterally extending side trim panels from just behind the operator's cab to the rear of the harvesting combine. Deployment arms are pivotally affixed at their proximal ends to the harvesting combine and pivotally affixed to the side trim panels at their distal ends. The deployment arms are generally horizontal when the deployment arms are retracted. The deployment arm distal ends are movable outwardly and upwardly to deploy the side trim panels away from the harvesting combine. A pivoting plank carried by the inside of the side trim panels and deployable from a generally vertical stowed position to a generally horizontal position when the side trim panels have been deployed.

5 Claims, 13 Drawing Sheets

(56) References Cited

U.S. PATENT DOCUMENTS

| | | | |
|---|---|---|---|
| 2011/0035903 A1* | 2/2011 | Sims | B62D 25/10 16/293 |
| 2016/0135373 A1* | 5/2016 | Keune | A01F 15/08 56/341 |
| 2016/0201293 A1* | 7/2016 | Roth | E02F 9/0833 296/26.13 |
| 2017/0144603 A1* | 5/2017 | Matthiesen | B60R 3/005 |
| 2018/0215421 A1* | 8/2018 | Claerhout | B62D 33/08 |

* cited by examiner

DEPLOYABLE TRIM PANELS FOR REPAIR/MAINTENANCE ACCESS TO AN ARTICULATED HARVESTING COMBINE

CROSS-REFERENCE TO RELATED APPLICATIONS

This application claims benefit of provisional 62/376,512 filed Aug. 18, 2016; and is cross-referenced to application Ser. No. 14/946,827 filed Nov. 20, 2015; Ser. No. 14/946,842 filed Nov. 20, 2015, now U.S. Pat. No. 9,901,030; Ser. No. 14/967,691 filed Dec. 14, 2015, now U.S. Pat. No. 9,820,442; Ser. No. 15/621,218 filed Jun. 13, 2017; Ser. No. 15/623,619 filed Jun. 15, 2017; Ser. No. 15/642,799 filed Jul. 6, 2017; Ser. No. 15/636,728 filed Jun. 29, 2017; Ser. No. 15/649,684, filed Jul. 14, 2017, now U.S. Pat. No. 10,045,488; Ser. No. 15/652,806 filed Jul. 18, 2017; and Ser. No. 15/654,786 filed Jul. 20, 2017.

STATEMENT REGARDING FEDERALLY SPONSORED RESEARCH AND DEVELOPMENT

Not applicable.

BACKGROUND OF THE INVENTION

The present disclosure relates to harvesting combines, optionally articulated (jointed), and more particularly to improved access to the forward module for repair and/or maintenance operations.

An articulated combine has a forward powered processing unit ("PPU") and a towed grain cart joined by an articulation joint assembly. Application Ser. No. 14/946,827 filed Nov. 20, 2015; Ser. No. 14/946,842 filed Nov. 20, 2015, now U.S. Pat. No. 9,901,030; Ser. No. 14/967,691 filed Dec. 14, 2015, now U.S. Pat. No. 9,820,442; Ser. No. 15/621,218 filed Jun. 13, 2017; Ser. No. 15/623,619 filed Jun. 15, 2017; Ser. No. 15/642,799 filed Jul. 6, 2017; Ser. No. 15/636,728 filed Jun. 29, 2017; Ser. No. 15/649,684, filed Jul. 14, 2017, now U.S. Pat. No. 10,045,488; Ser. No. 15/652,806 filed Jul. 18, 2017; and Ser. No. 15/654,786 filed Jul. 20, 2017, disclose such an articulated combine assembly.

In the design of crop harvesting combines, it is typical to style the machine by making special purpose styling panels for the side of the machine of metal or plastic having a quality paint finish to make an attractive appearance for the machine. Concurrently, it is typical to use these appearance panels also as a shield for the internal moving parts to enhance the safety of the machines. However, the complexity of grain handling and threshing necessitates a complex mechanical structure requiring routine maintenance and servicing. The use of the appearance panels as regulatory safety shielding by definition places the panels in the way for servicing and/or maintaining of the components the panels are covering. Recently, the trend in styling has driven the bottom edges of these panels ever lower on the sides of the combines, in some cases nearly obscuring the entire side of the functional machine.

Given this understanding, one realizes that the shield has to be moved in some fashion in order to allow access for servicing the machine components. This has unanimously resulted in shields being hinged at their tops (thereby "hung") from or near the top of the outside of the top structure. In order to gain access to the internal mechanical structure of the machine, the lower panel edges need to be moved in an arc away from the side of the machine. Alternatively, the shields can be hinged at their front or rear edges to open outwardly, as would a car door, to allow access to the internal mechanical structure of the machine. While these methods are obvious and for the most part are acceptable, they do have several shortcomings:

1. When hinged at the top, the machine operator or mechanic must exert significant force in an awkward motion to lift the panel to its up position or power must be supplied to substitute for the operator or mechanic. A significant amount of force is required to be exerted by the operator. Gas springs or the like often are used to supplement the lifting force required. Then, too, some type of mechanism must be devised to hold the panel in its up position for a time sufficient for the repair/maintenance to be completed.
2. Once opened, the bottom of the shield is usually either too close to the ground, which invites head bumps or scrapes, or is sufficiently high off as to disallow the machine operator or mechanic easy grabbing of bottom edge in order to pull the panel down for its closing.
3. If the front or rear vertical hinge is chosen instead, practice has proven that the large panel surface when opened outwardly in a significant wind becomes a sail and is significantly buffeted, if not torn off. Closing such a panel against the wind becomes difficult, mildly stated.
4. Regardless of how the panel is opened, the height of the internal mechanical components requiring servicing/maintenance is greater than the reach of the machine operator or mechanic. Even typical platforms do not provide sufficient height to solve this problem. The obvious solution is a ladder; however, there seldom is sufficient space for a ladder to be stored on the machine.
5. Use of a platform or ladder does not end the problems in that there is no backstop to prevent a backward fall by the machine operator or mechanic.
6. In the case of top horizontal hinge, the fixed and rigid location of the hinge is in the close proximity to some of the components requiring maintenance or servicing, even to the extent of preventing such service unless or until the unwieldy panel is detached and removed completely from the machine. The typically large size of typical modern combine side panels nearly always means that a mechanical lift of some sort is needed in order to dismount or remount such panels.

Thus, there is a need for making access to the inside of a harvesting combine easier for the machine operator or mechanic, especially if additional help is not present. It is to these considerations that the present disclosure is addressed.

BRIEF SUMMARY OF THE INVENTION

A harvesting combine has a forward operator's cab and having a rear, and carrying laterally extending side trim panels from just behind the operator's cab to the rear of the harvesting combine. Deployment arms are pivotally affixed at their proximal ends to the harvesting combine and pivotally affixed to the side trim panels at their distal ends. The deployment arms are generally horizontal when the deployment arms are retracted. The deployment arm distal ends are movable outwardly and upwardly to deploy the side trim panels away from the harvesting combine. A pivoting plank carried by the inside of the side trim panels and deployable from a generally vertical stowed position to a generally horizontal position when the side trim panels have been deployed.

BRIEF DESCRIPTION OF THE SEVERAL VIEWS OF THE DRAWINGS

For a fuller understanding of the nature and advantages of the present method and process, reference should be had to the following detailed description taken in connection with the accompanying drawings, in which.

The drawings will be described in greater detail below.

DETAILED DESCRIPTION OF THE INVENTION

The present disclosure provides a suitable means of simple side panel deployment for machine servicing/maintenance that solves many of the stated shortcomings of current glamor panels, while still providing an aesthetically pleasing styling look for the machine. Design criteria, then, include, for example:

(a) The entire panel should move away from the side of the machine to allow full access to the upper areas the panel is covering, (b) To allow ready access to the upper regions of the machine, deployment of the panel should result simultaneously in the deployment of a suitable walkway (catwalk, if you will) on which the mechanic can stand, move around, and perform required tasks comfortably.

(c) The act of deploying the walkway should inherently serve to lock the walkway in a working position and gravity should aid in maintaining the walkway in its working position. No additional action should be required to lock the panel into its working position. The weight of a person standing on the deployed walkway should be sufficient to overcome any means of walkway closure. The panel also should be precluded from moving while the machine operator or mechanic is standing on the deployed walkway.

(d) When the plank is not deployed, it should tuck into the panel such that it stores itself and does not result a special hardship on the looks or mechanics of the machine.

(e) The remaining height of the panel above the surface of the deployed walkway should be sufficient to generally meet regulatory height and proximity parameters so as to provide a suitably safe backstop to persons facing the machine during servicing, as is common with a handrail.

(f) The bottom of the panel should be of sufficient height off the ground to preclude a person of significant height (say, about 6' 6") from being at risk of bumping his/her head on the bottom edge of the panel.

(g) The panels should have "soft" edges, such as by having radiused corners and edges that are not sharp to the touch.

(h) The panels should be deployable by a single person, or alternatively and perhaps preferably, by a powered actuator.

(i) When deployed outwardly away from the machine, the side panels should not be in danger of being caught by high wind and broken/ripped from the machine.

(j) When in their resting location, the panels should serve to provide suitable people protection from the moving parts that lie behind the panels.

Figure 1:
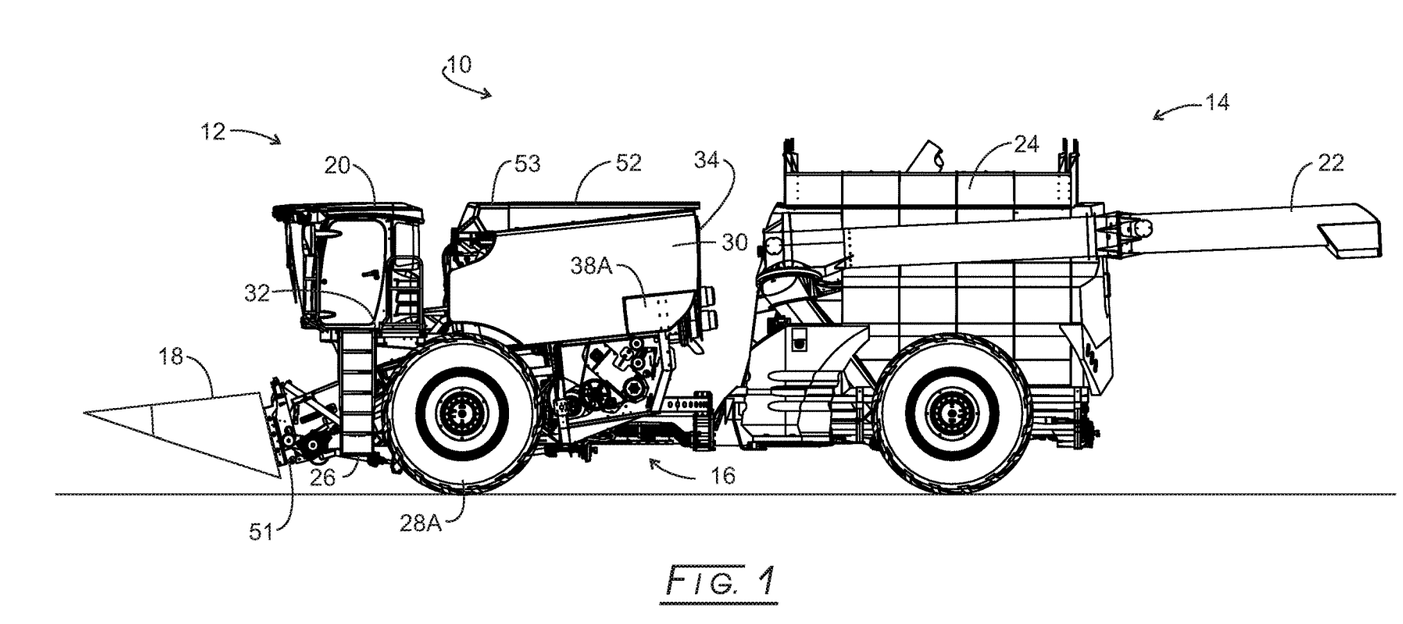
FIG. 1 is a side view of the articulated harvesting combine fitted with the disclosed straw chopper and distribution assembly disclosed herein.
Figure 2:
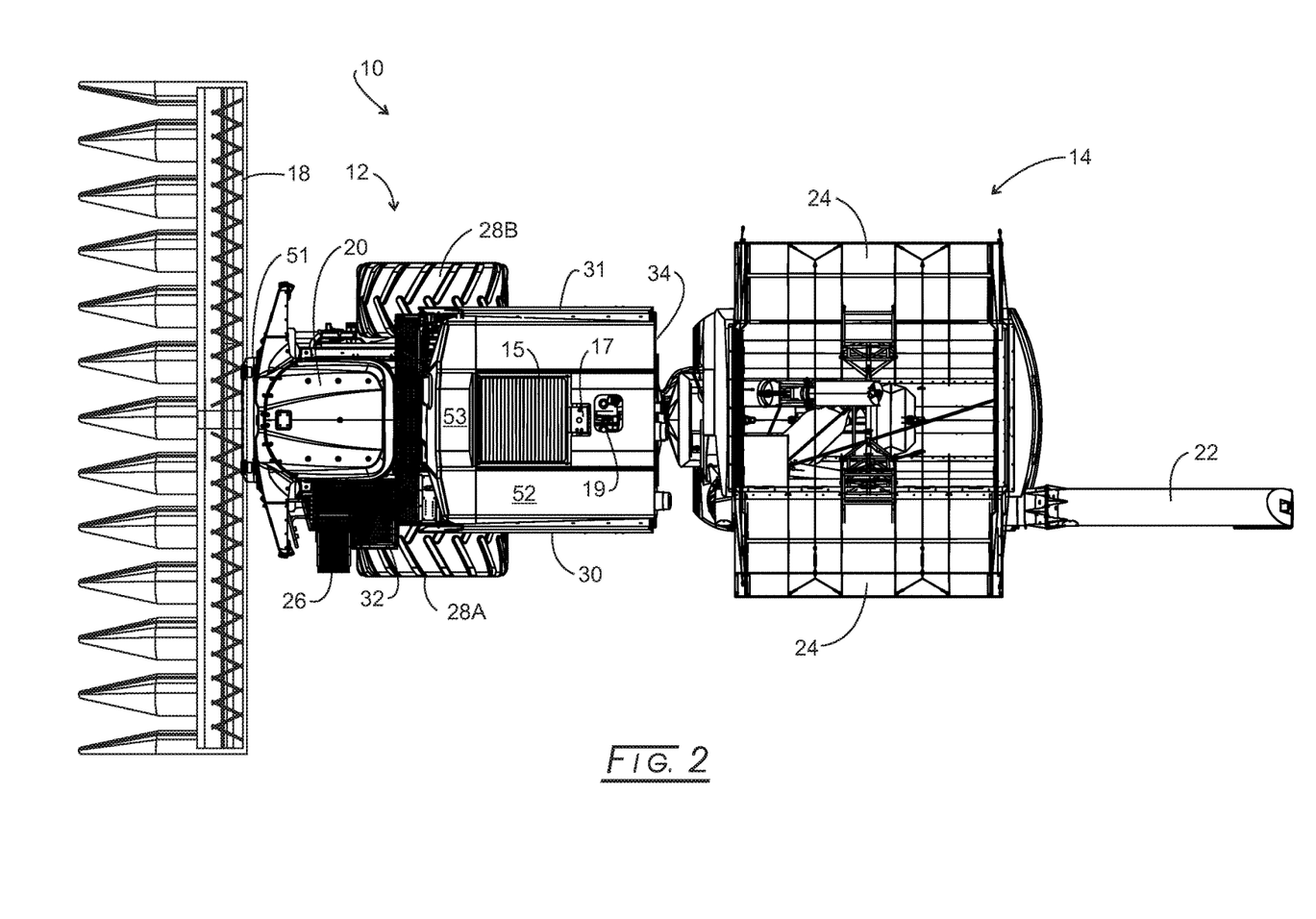
FIG. 2 is a top view of the articulated harvesting combine of FIG. 1 showing the pattern of distributed chopped straw therefrom.
Figure 3:
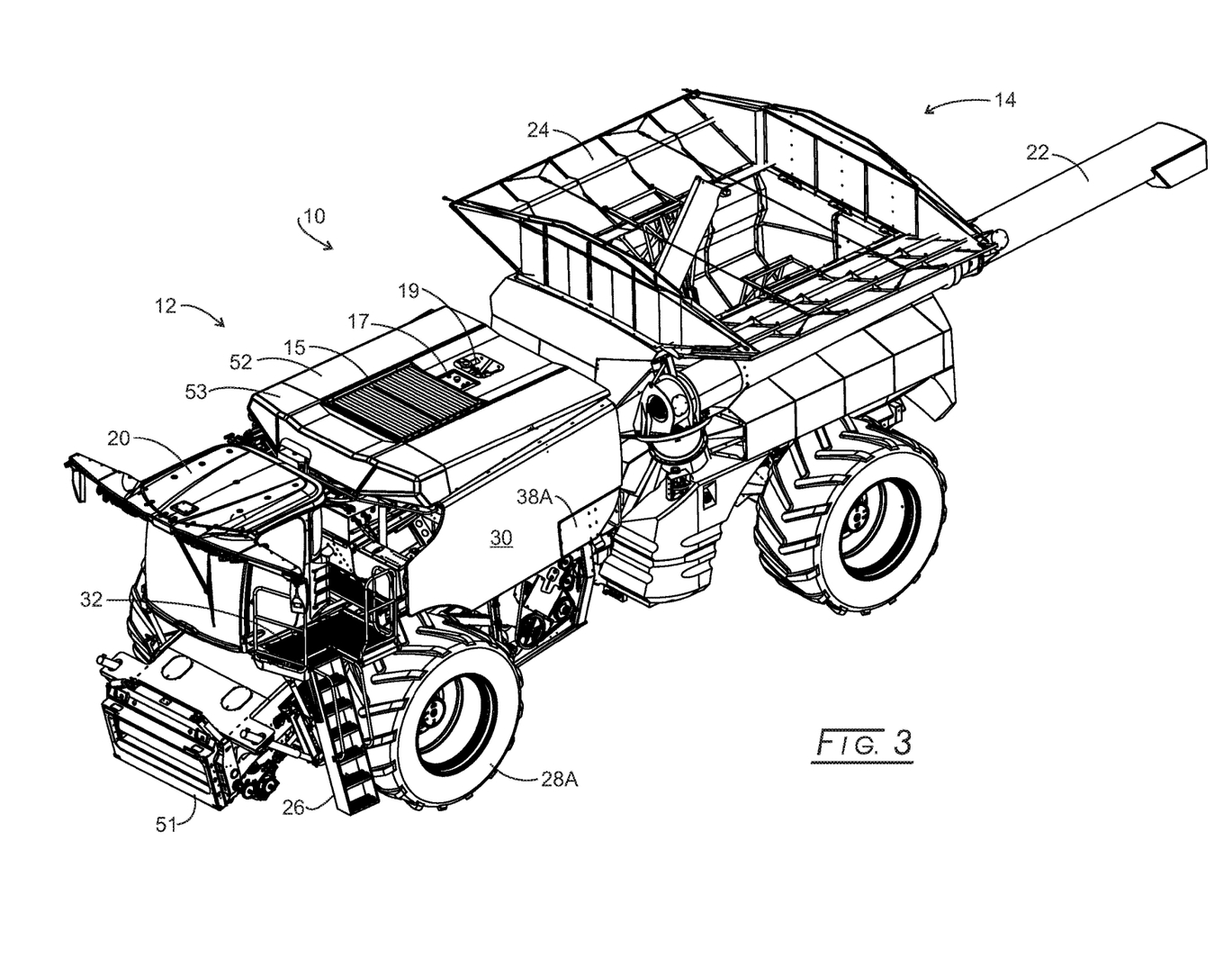
FIG. 3 is an isometric view of the left side of the articulated harvesting combine of FIG. 1.

Referring now to the drawings and specifically referring initially to FIGS. 1, 2, and 3, an articulated harvester, 10, consists of a powered PPU, 12, a rear grain cart, 14, and an articulation joint, 16, that connects PPU 12 with rear grain cart 14. The details of articulation joint 16 are disclosed in commonly owned application Ser. No. 14/946,827 filed Nov. 20, 2015. PPU 12 carries a grainhead, 18, supported by a feeder house, 51, operator's cab, 20, grain cleaning and handling assembly, and engines. PPU 12 is devoid of any grain storage, such being exclusive in rear grain cart 14. While both PPU 12 and rear grain cart 14 are shown being carried by wheel assemblies, one or both could be tracked. A screened air inlet, 15, is located atop PPU 12 where the air likely is the cleanest around harvesting combine 10. A radiator cap, 17, and engine exhaust, 19, are located behind screened air inlet 15. The arrows in FIG. 2 show the distribution of chopped straw, 21, created by the disclosed straw chopper assemblies. It will be observed that the distribution is at least as wide as grainhead 18, as desired, and the distribution is relatively even across the entire wide of chopped straw 21.

An off-loading auger assembly, 22, is in the folded home position and being carried by rear grain cart 14. Grain cart 14 also bears a foldable roof, 24, shown in an open position, but which can fold inwardly to cover grain stored in rear grain cart 14. Foldable roof 24 may be made of metal, plastic, or other suitable material, but may be made of durable plastic for weight reduction and easy folding/unfolding. A grain storage bin is carried by grain cart 14 may be made of plastic also in keeping with desirable weight reduction; although, it could be made of metal also at the expense of weight. All plastic parts may be filled with particulate or fiber reinforcement in conventional fashion and could be laminate in construction. Further details on rear grain cart 14 can be found commonly owned application Ser. No. 14/946,842 filed Nov. 20, 2015, now U.S. Pat. No. 9,901,030.

Figure 4:
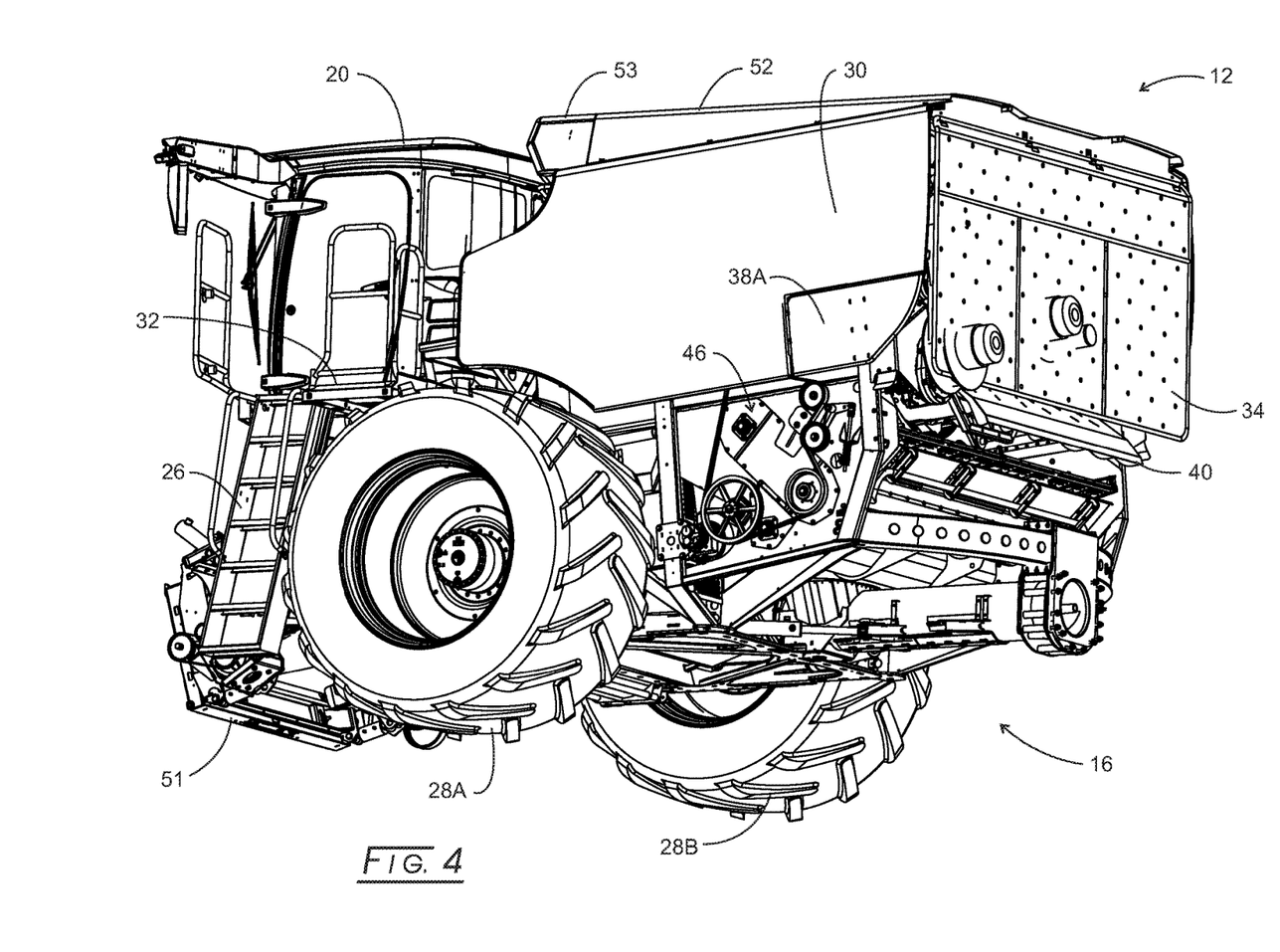
FIG. 4 is an isometric view of the left rear end of the forward unit of the articulated harvesting combine of FIG. 1 slightly from underneath the harvesting combine.
Figure 5:
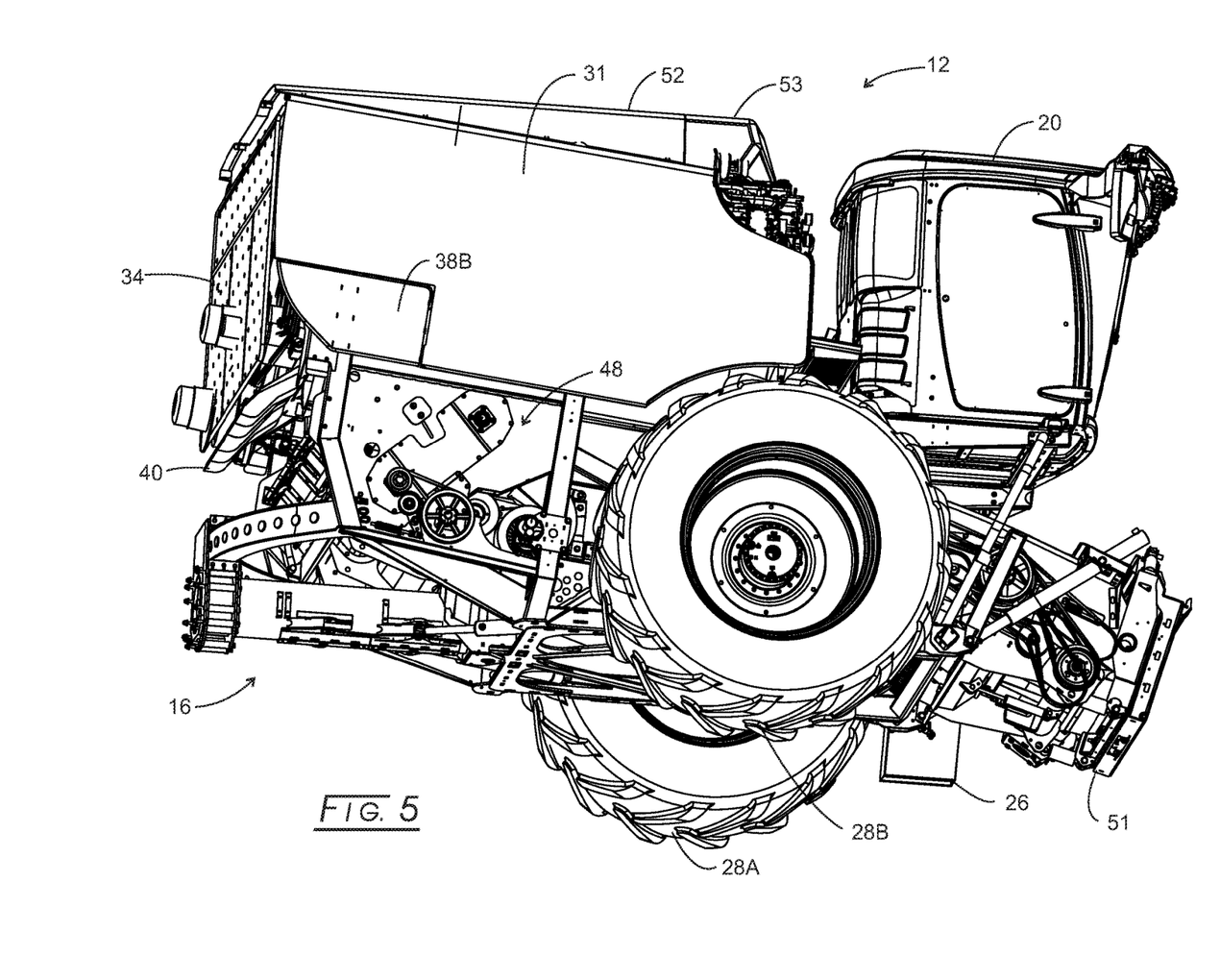
FIG. 5 is an isometric view of the left rear end of the forward unit of the articulated harvesting combine of FIG. 1 slightly from underneath the harvesting combine.

Referring now also to FIG. 4, the operator is granted access to cab 20 by a stair assembly, 26, as more fully described in U.S. Ser. No. 15/654,786, filed Jul. 20, 2017. PPU 12 is supported by wheel assemblies, 28A and 28B (FIG. 2). Movable side panels, 30 and 31 (see FIG. 5), grant access to the operator or mechanic to the internal mechanisms housed with in PPU 12 from stair assembly 26 and a platform, 32, and retains a foldable platform movable from a vertical home position while the panels are in place to a horizontal active position when the panels are moved away. Such foldable platform mates with platform.

In FIG. 4, a rear panel, 34, covers the back of PPU 12. Towards the rear of both panels 30 and 31 are MOG (or for present purposes, chopped straw) outlets, 36A and 36B, respectively, having top deflector plates, 38A and 38B, respectively. These deflector plates are adjustable for determining the location for depositing MOG expelled from the straw chopper assemblies, as further detailed In U.S. Ser. No. 15/652,806, filed Jul. 18, 2017. MOG discharged from the rear of PPU 12 strikes a deflector, 40 (see FIG. 5), to direct the MOG downwardly and not at grain cart 14. Six extensions, 42A-42F, terminated by sensors are located just before hood 40 and provide additional grain loss data to the operator.

Various drive, sprocket, wheel, and belt assemblies, 46 (FIG. 4) and 48 (FIG. 5), power and operate the bonus sieves assemblies disclosed in U.S. Ser. No. 15/649,684, filed Jul. 14, 2017, now U.S. Pat. No. 10,045,488, and will, accordingly, not be described herein. Suffice it to say that the MOG flow from the rotor (concaves and grates) is passed to the bonus sieves that are located in the rear outer space of PPU 12, which space is open due to the lack of rear wheel assemblies. Such bonus sieves assemblies permit all MOG recycle to be passed back to the bonus sieves assemblies and not to the concaves or grates. An additional airflow is provided for the bonus sieves assemblies, which also could be used in the disclosed straw chopper assemblies.

Figure 6:
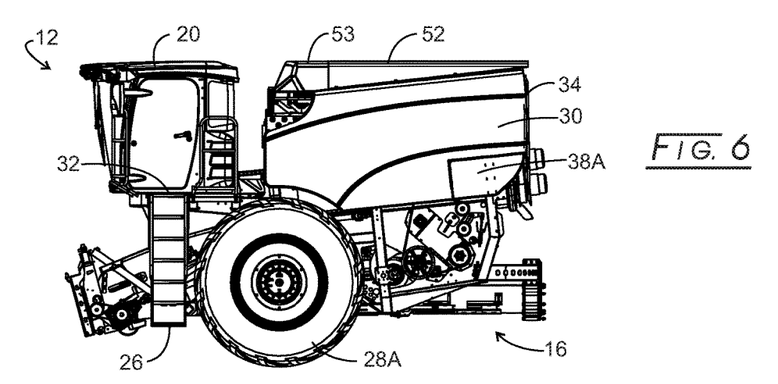
FIG. 6 is a side view of the forward PPU with the disclosed trim panels in a closed or home position.
Figure 7:
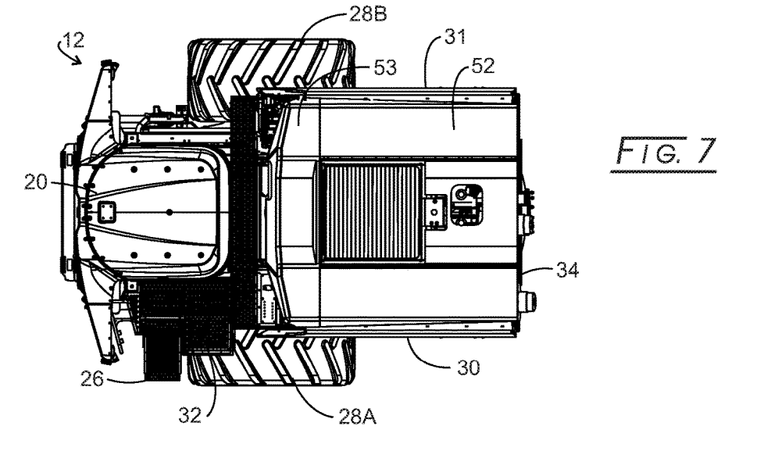
FIG. 7 is a top view of FIG. 6.
Figure 8:
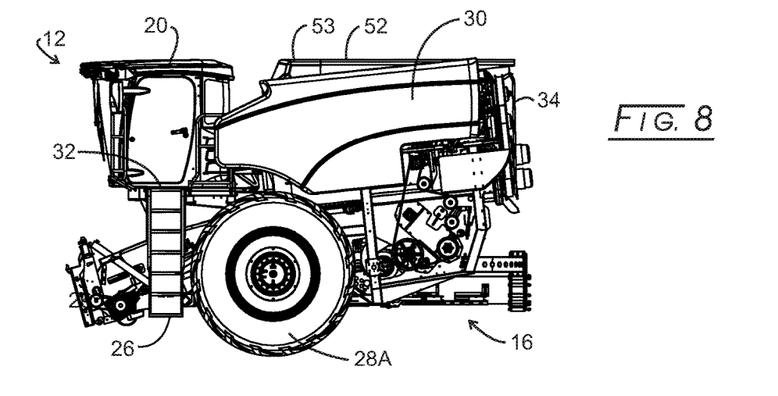
FIG. 8 is a side view of the forward PPU with the disclosed trim panels in a deployed position.
Figure 9:
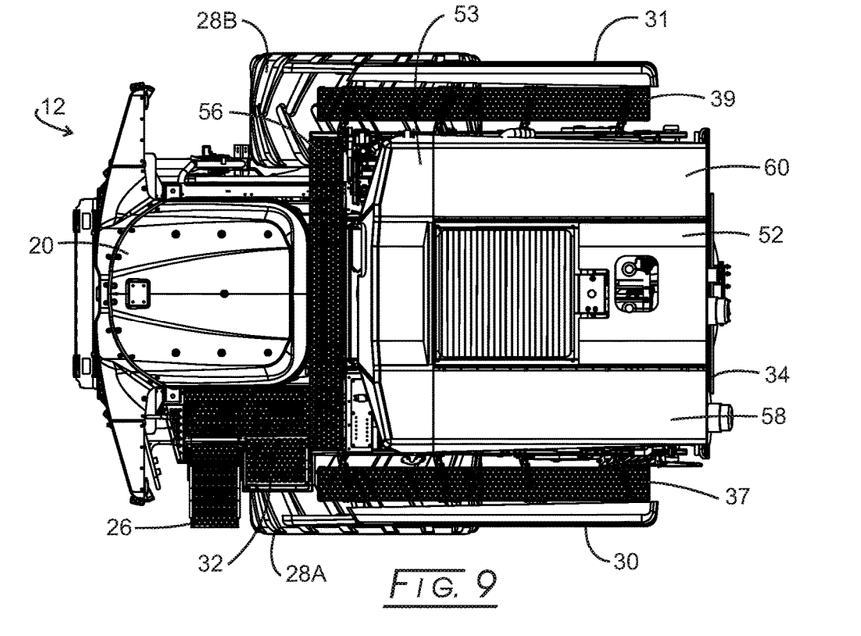
FIG. 9 is a top view of FIG. 6.
Figure 10:
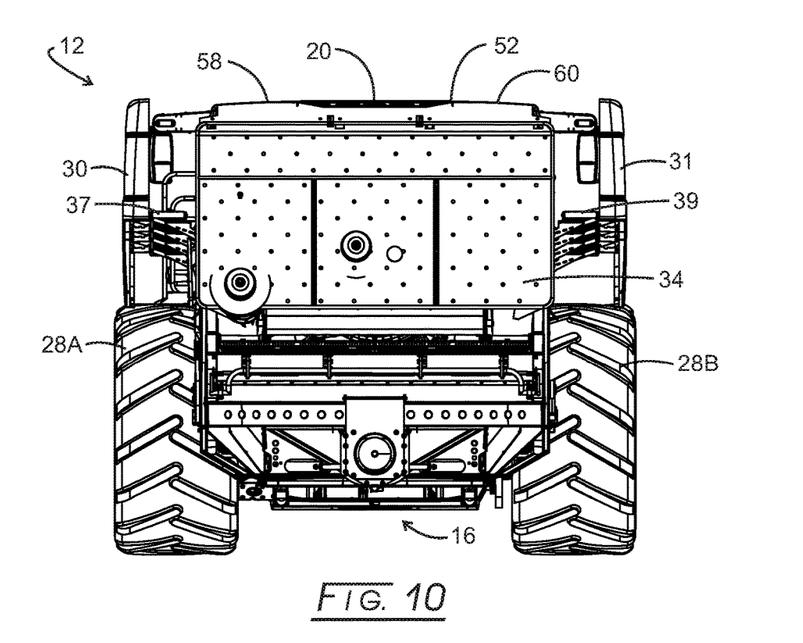
FIG. 10 is a rear view of forward PPU with the trim panels being deployed.

Panels 30, 31 (see also FIG. 5), and 34 only extend downwardly to cover about one-half of the height of PPU 12, allowing access to the lower exposed internal components for repairs, maintenance, and like occasions. FIGS. 1-5 show panels 30 and 31 in their stowed condition or state during operation of combine 10 and during truck transportation of combine 10. FIGS. 6 and 7 only show PPU 12 from one side and the top. Panels 30 and 31 are stowed. These views should be contrasted with FIGS. 8, 9, and 10 showing PPU 12 with both panels 30 and 31 being opened or deployed for access to internal components for maintenance and repair purposes.

It should be understood the disclosed trim panels and their function/operation are independent of the machine being articulated or conventional in design. In this regard, panels 30 and 31 move forwardly and upwardly in their deployed state. Comparing panel 30 in FIGS. 6 and 8 shows that panel 30 has been moved upwardly and forwardly in FIG. 8 compared to FIG. 6. Moreover, panels 30 and 31 each carry a plank or walkway, as more fully described below, for a mechanic to stand on for maintenance and/or servicing of the internal components of PPU 12. FIGS. 9 and 10 show panels 30 and 31 in their deployed state.

Figure 11:
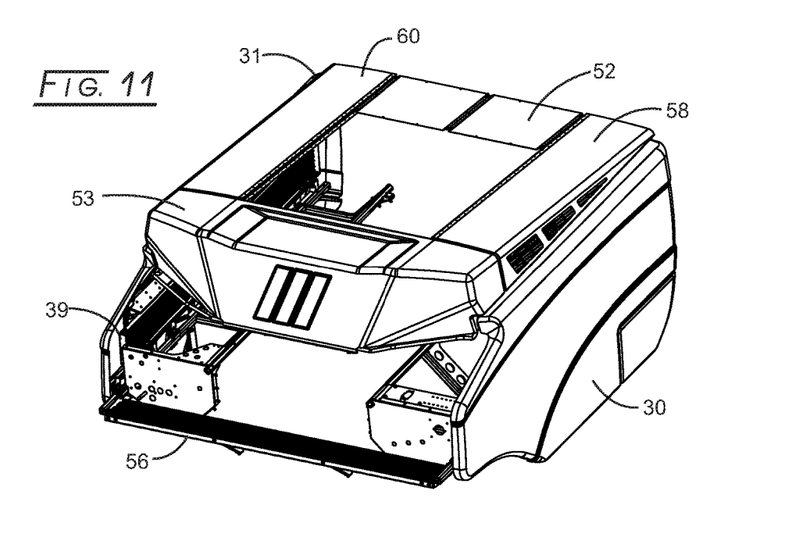
FIG. 11 is an isometric view of only the outer trim panels for the PPU with the trim panels in a closed position.
Figure 12:
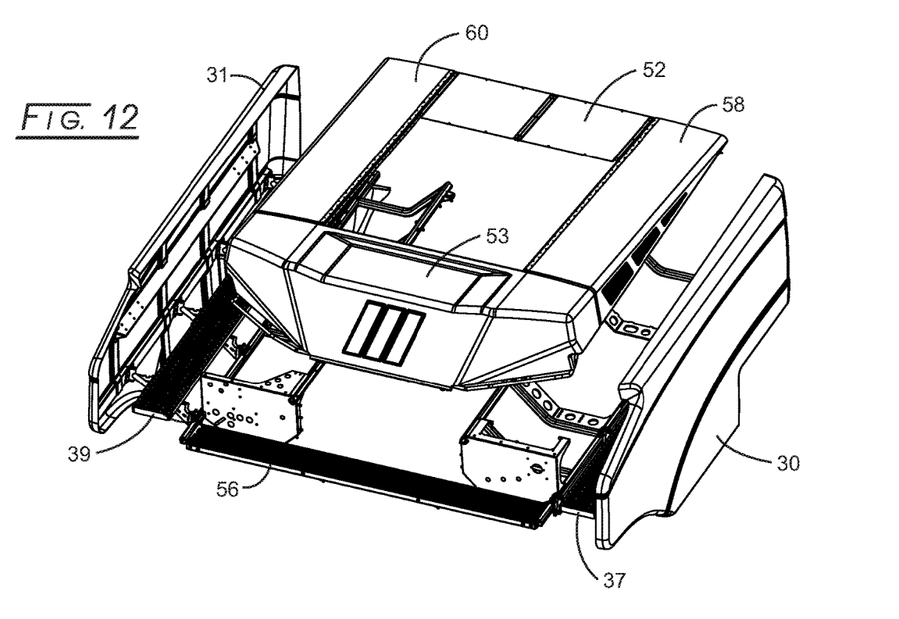
FIG. 12 is an isometric view of only the outer trim panels for the PPU with the trim panels in a deployed position.
Figure 12A:
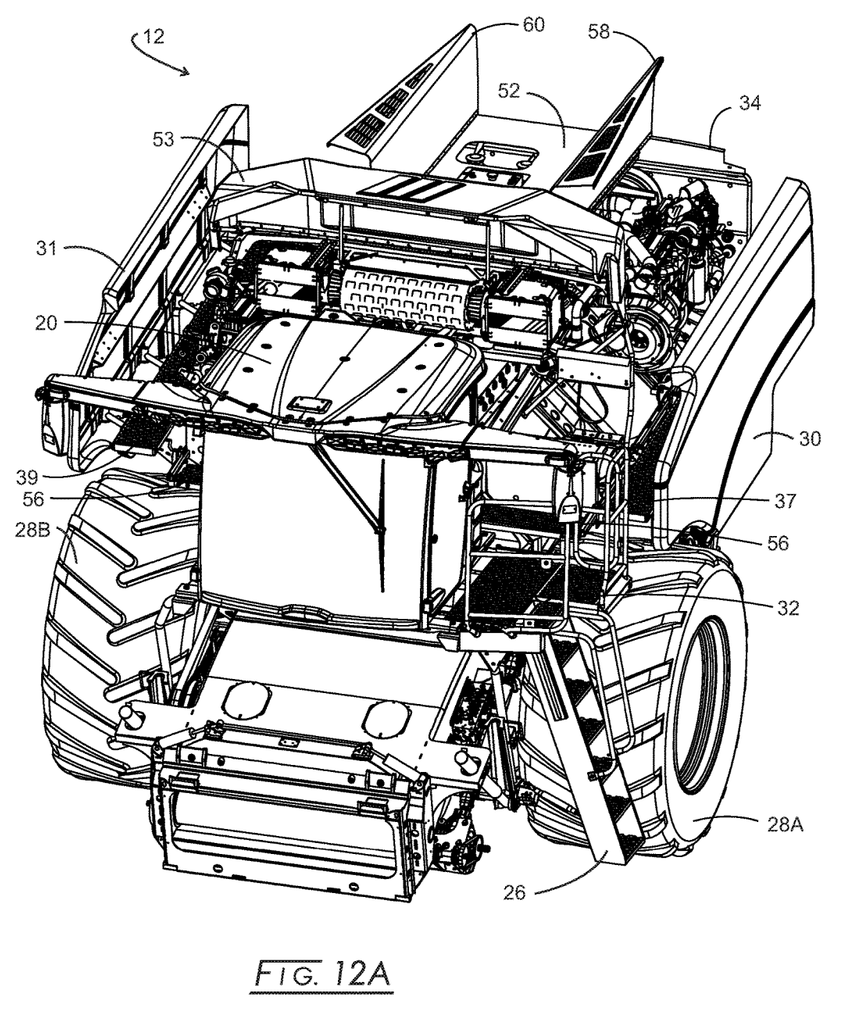
FIG. 12A is an isometric view of the outer trim panels for the PPU with the trim panels in a deployed position and a top panel opened for access to the other side of the PPU.

FIGS. 11, 12, and 12A show just the outer skin or trim pieces for PPU 12, inter alia, side panels 30, 31, and top panel assembly 52, 58, 60, and 53. A platform, 56, accessed from platform 32, permits the operator or mechanic to walk from one side of PPU 12 to the other side thereof. Moreover, front panel assembly 53 rotates (FIG. 12A) to the various components located underneath, as described in the co-pending applications cited herein.

Figure 13:
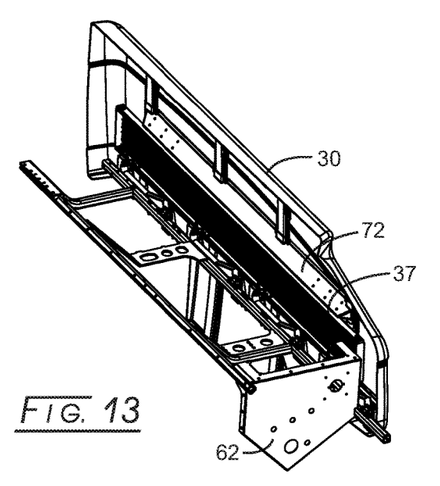
FIG. 13 is an isometric view of the inside of one of closed trim panels carrying a stowed board plank.
Figure 14:
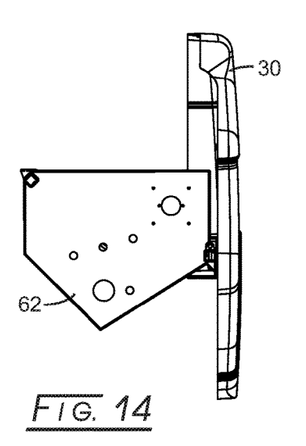
FIG. 14 is an end view of FIG. 13.
Figure 15:
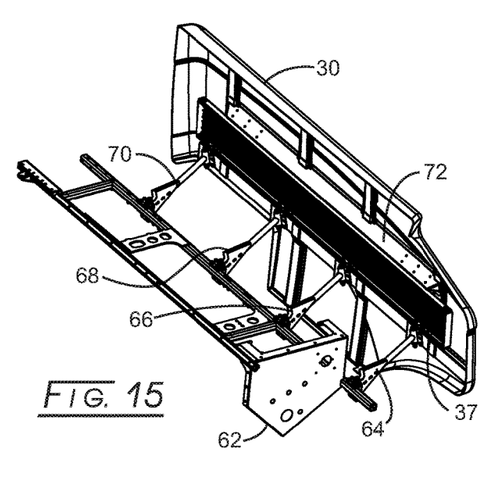
FIG. 15 is an isometric view of the inside of one of a deployed trim panel and the on board plank stowed.
Figure 16:
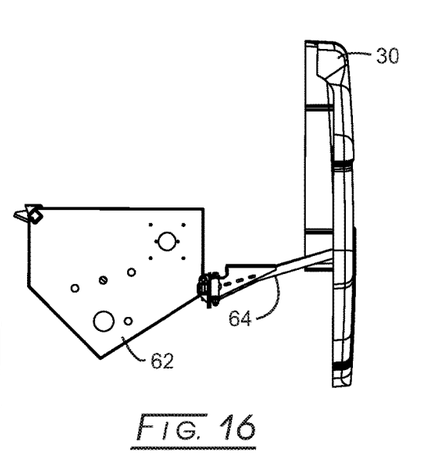
FIG. 16 is an end view of FIG. 15.

Panel 30 is deployed in FIGS. 13 and 14, but plank 37 still is in its stowed position. From FIGS. 15 and 16, pivoting deployment arms, 64, 66, 68, and 70, are seen carried by panel 30 at their distal ends and by a frame assembly, 62, at their proximal ends. Panel 30 could be manually deployable or a hydraulic cylinder assembly or other mechanism could provide for the panel's deployment. It should be understood that trim panel 31 is similarly constructed.

Figure 17:
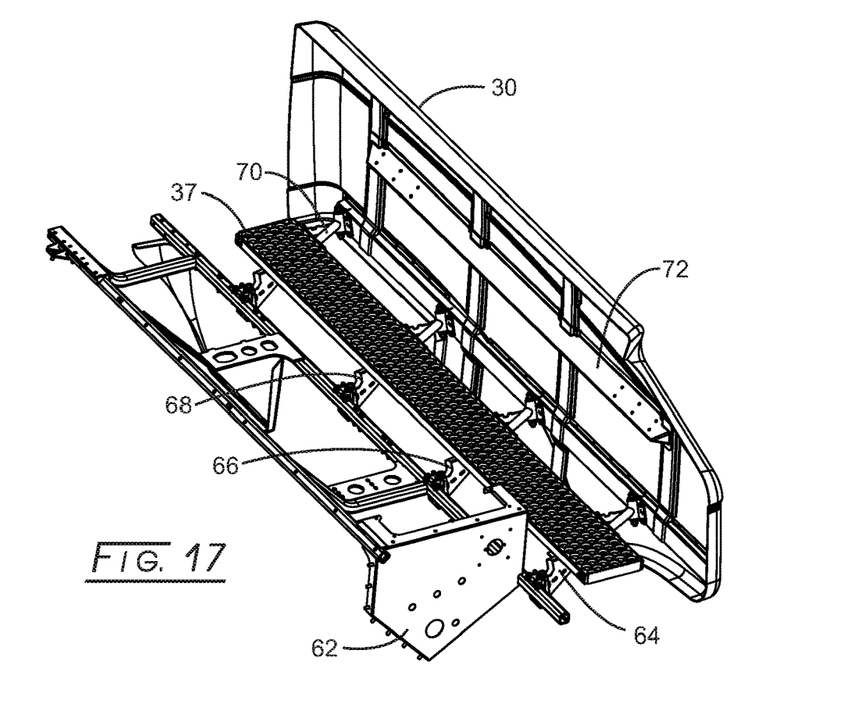
FIG. 17 is an isometric view of the inside of one of the deployed trim panel and the on board plank deployed.
Figure 18:
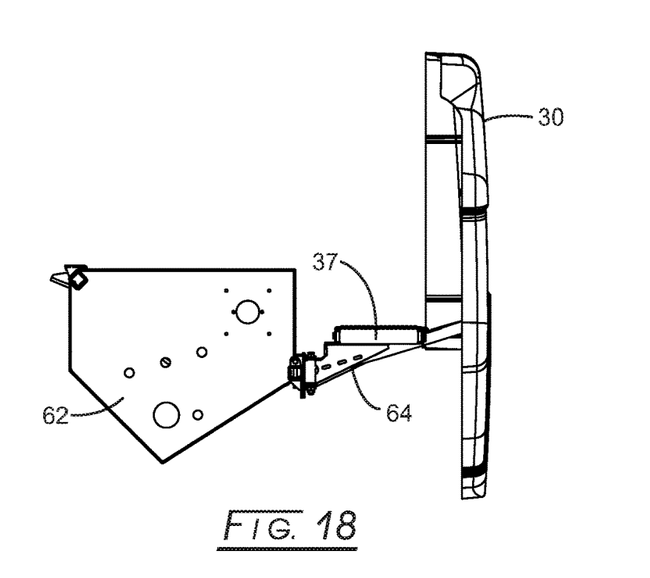
FIG. 18 is an end view of FIG. 17.
Figure 19:
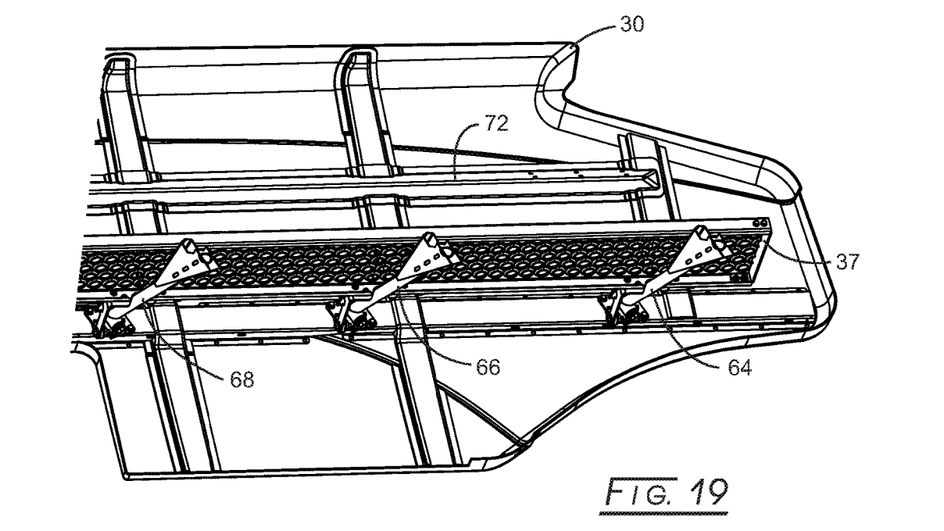
FIG. 19 is an isometric view of the deployed trim panel showing the underside of the deployed plank.
Figure 20:
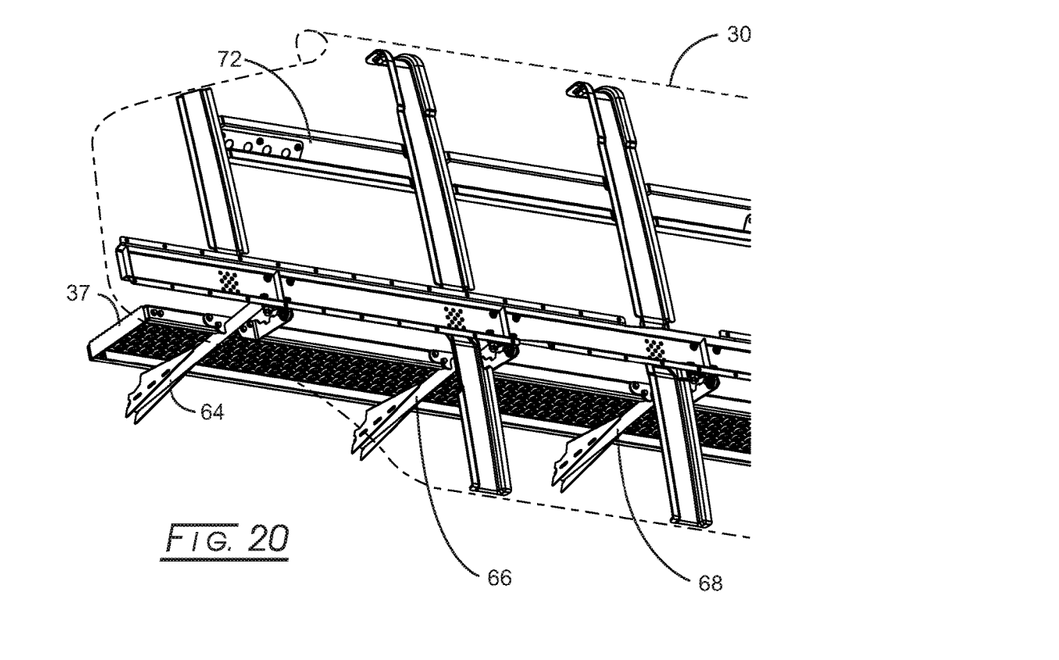
FIG. 20 is a view like FIG. 18 through a transparent sheet.

Plank 37 is pivotally or hingedly affixed to panel 30 so that it can be pivoted downwardly from the inside of panel 30 to its deployed horizontal position as in FIGS. 17 and 18. Also, revealed is an extended locking rail assembly, 72, that frictionally holds plank 37 in its vertical home position. It also will be observed that plank 37 has reinforced notches on its outer edge that fit over pivoting deployment arms 64, 66, 68, and 70 to hold plank 37 in the horizontal deployed condition, along with the weight of the operator or mechanic standing on plank 37. The exploded view in FIG. 19 from the underside of plank 37 reveals the notches and their locking to pivoting deployment arms 64, 66, 68, and 70. FIG. 18 shows the same view as does FIG. 17, but through a transparent sheet.

Not readily apparent in FIGS. 17 and 18, though of significance, is the height of trim panel 30 above plank 37. Such height serves as the safety hand rail that otherwise would be required by governmental safety regulations for the operator or mechanic using plank 37. The same is true of trim panel 31, though not shown in detail herein.

Figure 21:
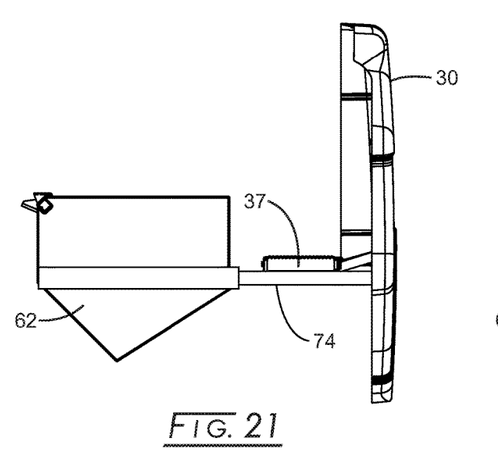
FIG. 21 is an end view like FIG. 18 of a side panel deployed by an alternative nested telescoping mechanism.
Figure 22:
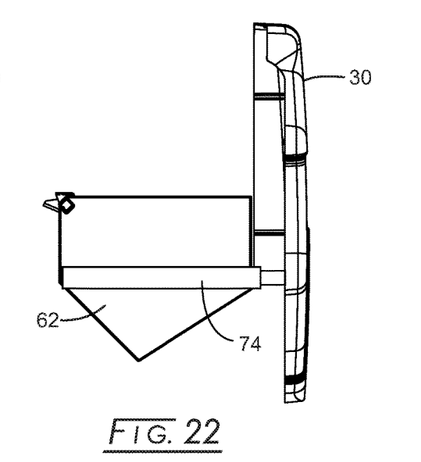
FIG. 22 is an end view of the alternative nested telescoping deploying mechanism of FIG. 21 with the trim panel stowed.

Mentioned above was the use of other mechanisms to deploy trim panels 30 and 31. FIGS. 21-27 illustrate but just a few of such other deploying mechanisms. In FIGS. 21 and 22, a nested telescoping assembly, 74, telescopes outwardly to deploy trim panel 30. Assembly 74 could be a linear actuator. Alternatively, a variety of motive forces could be used to deploy telescoping assembly 74. Telescoping assembly 74 could be circulated in cross section, as in FIG. 25, or could be rectangular in cross section, as in FIG. 26.

Figure 23:
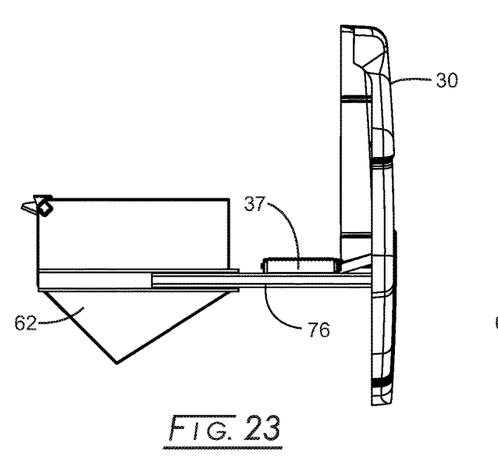
FIG. 23 is an end view like FIG. 18 of a side panel deployed by an alternative deploying drawer slide mechanism.
Figure 24:
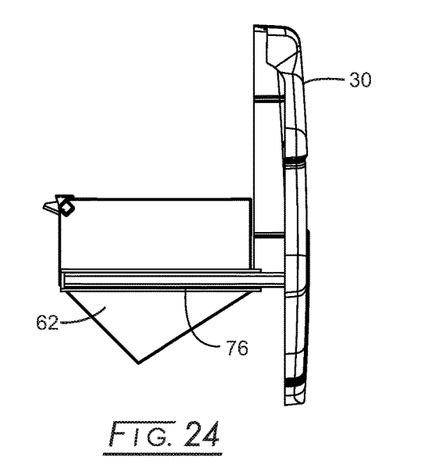
FIG. 24 is an end view of the alternative drawer slide deploying mechanism of FIG. 23 with the trim panel stowed.
Figure 25:
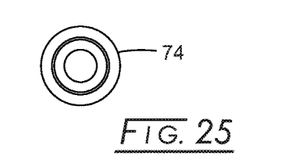
FIG. 25 is an end view of a round nested telescoping deploying mechanism for the trim panels.
Figure 26:
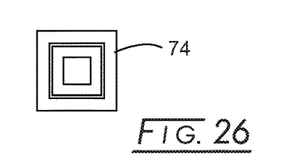
FIG. 26 is an end view of a square telescoping deploying mechanism for the trim panels.
Figure 27:
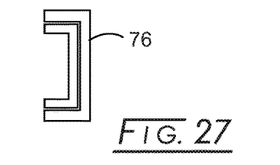
FIG. 27 is an end view of the drawer slide deploying mechanism for the trim panels.

A sliding drawer mechanism, 76, is used to deploy panel 30 in FIGS. 23 and 24. Again, a variety of motive forces or mechanisms could power slide drawer mechanism 76, which is seen in cross section in FIG. 27. It should be understood that the skilled artisan could envision a variety of different mechanisms for deploying of trim panels 30 and 31 than are illustrated herein.

While the apparatus, system, and method have been described with reference to various embodiments, those skilled in the art will understand that various changes may be made and equivalents may be substituted for elements thereof without departing from the scope and essence of the disclosure. In addition, many modifications may be made to adapt a particular situation or material in accordance with the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

The invention claimed is:

1. In a grain harvesting combine having a forward operator's cab and having a rear, the improvement which comprises:
   (a) laterally extending side trim panels from just behind the operator's cab to the rear of the harvesting combine, the side trim panels having an inside and a height;
   (b) deployment arms pivotally affixed at their proximal ends to the harvesting combine and pivotally affixed to the side trim panels at their distal ends, the deployment arms being generally horizontal when the deployment arms are retracted, the deployment arm distal ends being moved outwardly and upwardly to deploy the side trim panels away from the harvesting combine;
   (c) a plank pivotally carried by the inside of the side trim panels and deployable from a generally vertical stowed position to a generally horizontal position resting atop the deployment arms when the side trim panels have been deployed, notches in the plank mating with the deployment arms to hold the plank fast when deployed, wherein the height of the trim panels above the deployed plank serving as a safety hand rail.

2. The improved harvesting combine of claim 1, wherein the side trim panels are manually deployable.

3. The improved harvesting combine of claim 1, wherein the side trim panels are deployed by a cylinder assembly.

4. In a grain harvesting combine having a forward operator's cab and having a rear, the improvement which comprises:
   (a) laterally extending side trim panels from just behind the operator's cab to the rear of the harvesting combine, the side trim panels having an inside and a height;
   (b) telescoping deployment arms affixed at their proximal ends to the harvesting combine and affixed to the side trim panels at their distal ends, the telescoping deployment arms moving generally horizontally to deploy the trim panels outwardly away from the harvesting combine;
   (c) a plank pivotally carried by the inside of the side trim panels and deployable from a generally vertical stowed position to a generally horizontal position resting atop the deployment arms when the side trim panels have been deployed, notches in the plank mating with the deployment arms to hold the plank fast when deployed, wherein the height of the trim panels above the deployed plank serving as a safety hand rail.

5. In a grain harvesting combine having a forward operator's cab and having a rear, the improvement which comprises:
   (a) laterally extending side trim panels from just behind the operator's cab to the rear of the harvesting combine, the side trim panels having an inside and a height;
   (b) sliding drawer mechanism deployment arms affixed at their proximal ends to the harvesting combine and affixed to the side trim panels at their distal ends, the sliding drawer mechanism deployment arms moving generally horizontally to deploy the trim panels outwardly away from the harvesting combine;
   (c) a plank pivotally carried by the inside of the side trim panels and deployable from a generally vertical stowed position to a generally horizontal position resting atop the deployment arms when the side trim panels have been deployed, notches in the plank mating with the deployment arms to hold the plank fast when deployed, wherein the height of the trim panels above the deployed plank serving as a safety hand rail.

* * * * *